United States Patent
Uchino et al.

(10) Patent No.: US 6,776,811 B2
(45) Date of Patent: Aug. 17, 2004

(54) CERIUM BASED ABRASIVE MATERIAL, METHOD OF QUALITY EXAMINATION THEREOF, AND METHOD OF PRODUCTION THEREOF

(75) Inventors: Yoshitsugu Uchino, Shinagawa-ku (JP); Hidehiko Yamasaki, Shinagawa-ku (JP); Kazuaki Takahashi, Ageo (JP)

(73) Assignee: Mitsui Mining & Smelting, Co., Ltd., Tokyo (JP)

(*) Notice: Subject to any disclaimer, the term of this patent is extended or adjusted under 35 U.S.C. 154(b) by 0 days.

(21) Appl. No.: 10/344,453

(22) PCT Filed: Sep. 18, 2001

(86) PCT No.: PCT/JP01/08087

§ 371 (c)(1),
(2), (4) Date: Feb. 12, 2003

(87) PCT Pub. No.: WO02/24827

PCT Pub. Date: Mar. 28, 2002

(65) Prior Publication Data

US 2003/0172595 A1 Sep. 18, 2003

(30) Foreign Application Priority Data

Sep. 20, 2000 (JP) ........................................ 2000-284895
Sep. 20, 2000 (JP) ........................................ 2000-284950

(51) Int. Cl.[7] ................................................ C09K 3/14
(52) U.S. Cl. ............................ 51/307; 51/309; 423/263
(58) Field of Search ....................... 51/307, 309; 106/3; 423/263; 378/70, 71

(56) References Cited

FOREIGN PATENT DOCUMENTS

| JP | 6-330025 | 11/1994 |
| JP | 07-223166 | 8/1995 |
| JP | 07-290367 | 11/1995 |
| JP | 09-183966 | 7/1997 |
| JP | 10-106993 | 4/1998 |
| JP | 11-269455 | 10/1999 |
| JP | 11-322310 | 11/1999 |
| JP | 2000-026840 | 1/2000 |
| JP | 2000-188270 | 7/2000 |

*Primary Examiner*—Michael Marcheschi
(74) *Attorney, Agent, or Firm*—Rothwell, Figg, Ernst & Manbeck, P.C.

(57) ABSTRACT

The present invention provides a method of examining quality of cerium-based abrasives which can simply determine their grinding characteristics. Specifically, the method employs X-ray diffractometry to examine qualities based on, for example, B/A wherein A and B are peak intensities relevant to $Ln_xO_y$ and $LnF_3$, respectively. The present invention further provides: a method of producing a cerium-based abrasive which can give cerium-based abrasive with specific grinding characteristics; and a cerium-based abrasive which has specific grinding characteristics for specific purposes.

13 Claims, 3 Drawing Sheets

CERIUM BASED ABRASIVE MATERIAL, METHOD OF QUALITY EXAMINATION THEREOF, AND METHOD OF PRODUCTION THEREOF

CROSS-REFERENCE TO RELATED APPLICATION

The present application is a national stage filing under 35 U.S.C. §371 of PCT/JP01/08087 filed on 18 Sep. 2001, and designating the U.S.

TECHNICAL FIELD

This invention relates to a method of examining quality of cerium-based abrasives, a method of producing a cerium-based abrasive, and a cerium-based abrasive.

BACKGROUND ART

Recently, glass materials have been used for various purposes. Of these, advanced glass materials including glass substrates for optical and magnetic disks, active matrix type liquid crystal displays (LCDs), color filters for liquid crystal TV sets, watches, calculators, LCDs for cameras, displays for solar cells or the like, LSI photomasks and optical lenses, and optical lenses themselves are required to be surface-ground highly precisely.

These glass substrates are normally surface-ground using a cerium-based abrasive composed of an oxide of rare-earth, in particular cerium oxide, as a main ingredient, because cerium oxide shows several times higher grinding efficiency than zirconium oxide and silicon dioxide for grinding glass materials.

The common stock materials for cerium-based abrasives include rare-earth materials, e.g., carbonates, hydroxides and oxalates of rare-earth elements, and oxides produced by burning them. These stock materials are normally prepared from bastnasite concentrate or other cerium-containing rare-earth materials by removing a part of rare-earth elements, e.g., neodymium (Nd) and prasceodymium (Pr), and radio-active materials and the like by a known chemical treatment.

A cerium-based abrasive from a carbonate or oxide of rare-earth is produced by the following process. The process starts with slurrying or wet-crushing the stock material followed by chemical treatment with a mineral acid and, as required, with hydrofluoric acid or ammonium fluoride. The resultant slurry is subjected to filtration, drying and roasting. Finally, it is crushed and classified to have an abrasive of specific particle size.

A cerium-based abrasive is required to have specific grinding characteristics for specific purposes. It is therefore necessary to grasp the grinding characteristics of a produced abrasive by, e.g., analyzing these characteristics. For example, it is known that grinding speed, referred to as grindability as one of important grinding characteristics, increases as the abrasive crystal size grows by the roasting step. It is however difficult to accurately grasp the grinding characteristics only from average particle size determined by the common method of analyzing particle size distributions. Therefore, an abrasive is examined, as required, for its quality by a test in which a test piece is actually ground by the abrasive. The grinding test is time-consuming, because the ground test piece is weighed to determine grindability, or ground surface is observed to confirm scratches. Therefore, a more simple method of examining the quality has been in demand. At the same time, a method of producing abrasives with specific grinding characteristics can greatly save works for, e.g., quality examination, and hence is desirable, because it produces abrasives more efficiently.

The present invention is developed in the light of the above problems. It is an object of the present invention to provide a method of examining quality of cerium-based abrasives which can simply determine their grinding characteristics. It is another object of the present invention to provide a method of producing a cerium-based abrasive which can give cerium-based abrasives with specific grinding characteristics. It is still another object of the present invention to provide a cerium-based abrasive which has specific grinding characteristics for specific purposes.

DISCLOSURE OF THE INVENTION

Figure 1:
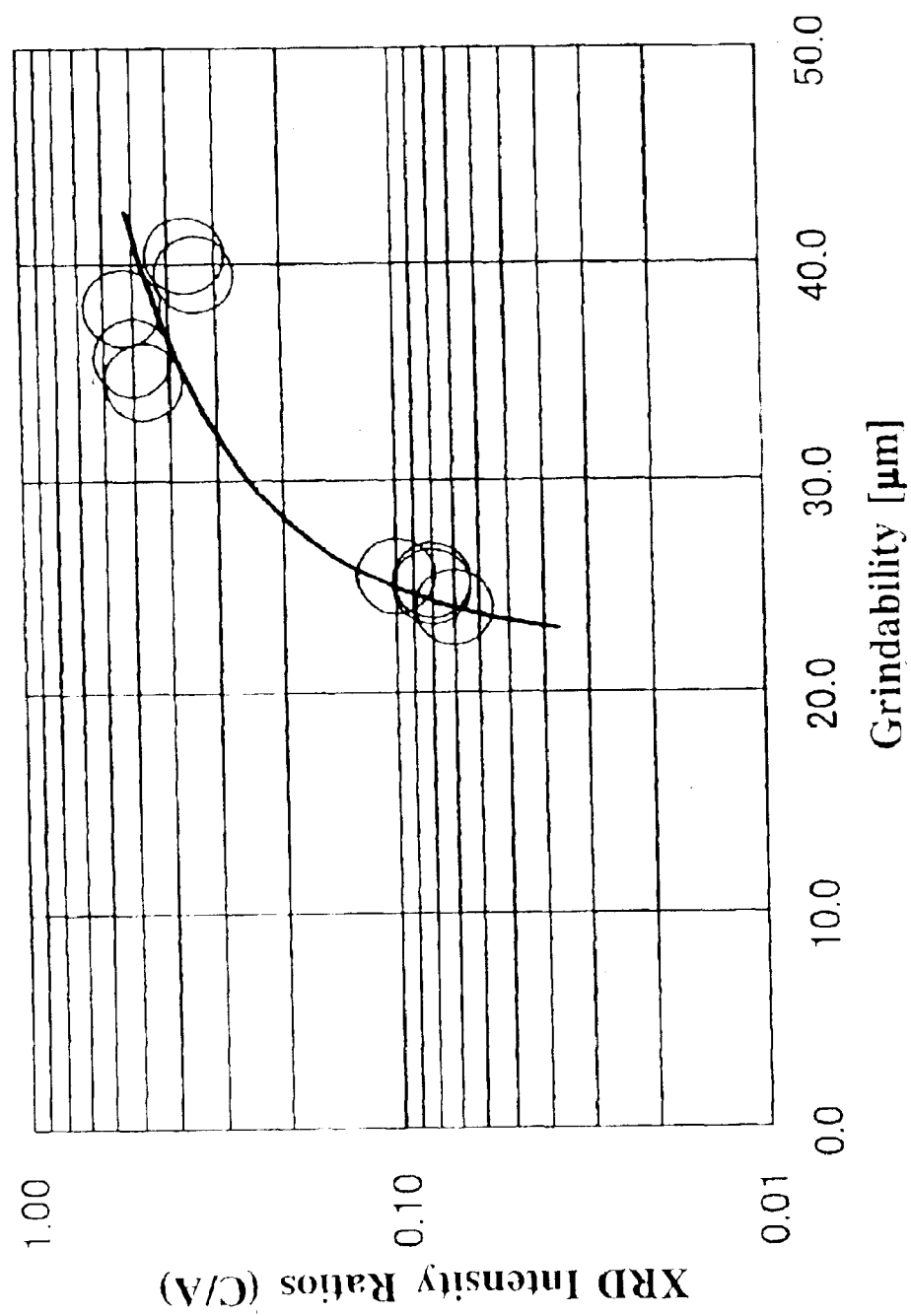
FIG. 1 shows the relationship between grindability and C/A ratio.

The inventors of the present invention have noted incorporation of fluorine (F) in a cerium-based abrasive in order to solve the above problems. Fluorine, which has been incorporated mainly to improve grindability, forms a material of specific crystalline structure, depending on its content and roasting temperature, in abrasive or stock therefore in which it is incorporated. More concretely, a fluorine-containing compound is found to have the following crystalline structure observed by X-ray diffractometry (XRD) in a cerium-based abrasive or stock therefor in which it is incorporated:

(1) A fluorine (F)-containing compound is present in the form of $LnF_3$ (e.g., $LaF_3$, wherein Ln is lanthanoids and La is lanthanum) in an F-containing oxide of cerium-based rare earth, and $LnCO_3F$ in an F-containing carbonate of cerium-based rare earth in stock material before roasting.

(2) When $LnCO_3F$-containing stock material is roasted, Ln having a larger ionic radius decreases in content in a solid solution, being discharged in the form of $LnF_3$ and contracting the $Ln_xO_y$ lattice. This changes the crystal phase. For example, the crystal phase is transformed from the one identified as $Ce_{0.5}Nd_{0.5}O_{1.75}$ by X-ray diffractometry (XRD) to the one identified as $Ce_{0.75}Nd_{0.25}O_{1.875}$. It should be noted, however, that the crystal phase identified as $Ce_{0.5}Nd_{0.5}O_{1.75}$ or $Ce_{0.75}Nd_{0.25}O_{1.875}$ has the main peak in the XRD pattern, even at a low Nd content, from which it is considered to be an oxide containing La, which is normally present in a cerium-based abrasive at several tens % by atom on Ce, namely on the order of 0.2 to 0.7 times the Ce content in the number of atoms.

(3) $LnF_3$, when discharged at a high roasting temperature, grows as the LnOF phase (e.g., discharged $LaF_3$ grows as LaOF phase). Growth of this phase will be retarded as a fluorine content increases, unless a roasting temperature is increased. Conversely, it grows at a lower roasting temperature, as an F content decreases.

Ln (lanthanoids) in this specification contains at least one element of La (lanthanum), Ce (cerium) or Nd (neodymium) and $LnF_3$ is $LaF_3$, $CeF_3$ or the like, and LnOF is LaOF, CeOF or the like. $Ln_xO_y$ is $La_2O_3$, $CeO_2$, $Ce_{0.5}Nd_{0.5}O_{1.75}$, $Ce_{0.75}Nd_{0.25}O_{1.875}$ or the like, where normally the relationship $3/2 \leq y/x \leq 2$ holds. These compounds generally contain La at 5.0% to 85% per 100% of Ce, namely on the order of 0.05 to 0.85 times the Ce content in the number of atoms, and Nd at 1.0% to 50% per 100% of Ce, namely on the order of 0.01 to 0.5 times the Ce content in the number of atoms.

The inventors of the present invention have further studied extensively based on the above XRD analysis results and found that whether or not a cerium-based abrasive containing F and, at the same time, La or Nd to some extent has good quality (grinding characteristics) can be determined by its XRD analysis results, reaching the present invention.

More concretely, the present invention provides a method of examining quality (grinding characteristics) of a F-containing cerium-based abrasive containing La or Nd each at 0.5% or more per 100% of Ce, all by atom, and having a specific surface area of 12 m$^2$/g or less, the method being based on XRD analysis with Cu—K$\alpha_1$ line as an X-ray source, wherein the XRD analysis measures intensity A of the maximum peak "a" in a diffraction angle (2θ) range from 5 to 80°, and at least one of intensity B of the maximum peak having a diffraction angle in a range of 27.5±0.3° and smaller than the angle of the peak "a," intensity C of the maximum peak having a diffraction angle in a range of 26.5±0.5°, and intensity D of the maximum peak having a diffraction angle in a range of 24.2±0.5°, and at least one of the B/A, C/A and D/A ratios is determined, to examine the abrasive by comparing one of the ratios with that of an abrasive of known grinding characteristics determined by XRD analysis.

When an abrasive from a stock material containing limited quantities of impurities other than rare-earth elements, e.g., carbonate or oxide of rare-earth, is analyzed by XRD, the maximum peak "a" (diffraction angle: 2θ$_A$, intensity: A) in a diffraction angle (2θ) range from 5 to 80° is normally relevant to the [111] plane of Ln$_x$O$_y$ (1≦y/x≦2). The maximum peak "b" (diffraction angle: 2θ$_B$, intensity: B) having a diffraction angle in a range of 27.5±0.3° and smaller than the angle of the peak "a," if appears, indicates the presence of LnF$_3$. The maximum peak "c" (diffraction angle: 2θ$_C$, intensity: C) appearing at diffraction angle in a range of 26.5±0.5° indicates the presence of LnOF, and the maximum peak "d" (diffraction angle: 2θ$_D$, intensity: D) appearing at a diffraction angle in a range of 24.2±0.5°, if appears, indicates the presence of LnF$_3$ as well as peak b.

It is found that there is a certain relationship between the XRD analysis results (e.g., intensity A of the maximum peak relevant to Ln$_x$O$_y$, and B/A and D/A ratios, wherein B and D are intensities of the maximum peaks relevant to LnF$_3$) and quality (i.e., grinding characteristics related to scratches and grindability) of a cerium-based abrasive. When a relationship between B/A, C/A or D/A ratio and grinding characteristics of a cerium-based abrasive of known grinding characteristics is established, grinding characteristics of another cerium-based abrasive can be simply examined by measuring its XRD characteristics, e.g., B/A ratio. It is found by investigating the results that the above examination method is particularly effective for an F-containing cerium-based abrasive containing La or Nd each at 0.5% or more per 100% of Ce, all by atom, and having a specific surface area of 12 m$^2$/g or less. In particular, the abrasive preferably contains fluorine at 1.0 to 15% by weight. At less than 1.0% by weight, the abrasive may deviate from the range in which it can be adequately examined by the present invention; for example, it may not have the B/A ratio of 0.06 or more even when it produces a lot of scratches. At more than 15% by weight, on the other hand, the abrasives satisfying the examination standard of, e.g., B/A<0.06, will be rarely produced.

In the actual quality examination, a cerium-based abrasive is analyzed by XDR to measure the peak "a" and at least one of the peaks "b," "c" and "d," and find at least one of B/A, C/A and D/A ratios, and the characteristics of a cerium-based abrasive (grinding characteristics) are examined based on the established relationship between the grinding characteristics and the ratio.

The quality examination standards include whether the relationships B/A<0.06 or D/A<0.04 or not. It is found that an abrasive leaves only a limited number of scratches on the ground surface, e.g., glass surface, as its B/A or D/A ratio decreases, and that a cerium-based abrasive satisfying the relationship B/A<0.06 or D/A<0.04 produces scratches to only a limited extent and is practical. Basically, either the peak "b" or "d" may be used, but the peak "b" is more preferable because of its higher peak intensity. However, when the peak "a" is identified as that relevant to Ce$_{0.5}$Nd$_{0.5}$O$_{1.75}$ the diffraction angles of the peaks "a" and "b" are very close to each other, and peak intensity B is difficult to determine when intensity B of the peak "b" is much lower than the maximum peak intensity A. In such a case, use of the peak "d" is more preferable.

Because it is found that an abrasive tends to have higher grindability as its C/A ratio increases, the ratio can be used to predict grindability of an adhesive. It can be also used to examine quality of an adhesive by knowing whether it attains or exceeds a standard corresponding to a required grindability. This method allows to simply examine quality of cerium-based adhesives, thereby improving examination work efficiency, which, in turn, allows to conduct quality examinations more frequently, and to improve reliability of cerium-based abrasive products.

When an abrasive is required to have certain quality (i.e., grinding characteristics) for a specific purpose, its quality is examined based on the standard corresponding to the required grinding characteristics. More concretely, for example, consider a case where a cerium-based abrasive is required to leave only a limited number of scratches on the ground surface and its grindability can be low to some extent. In this case, B/A or D/A ratio may be used as the standard. In other words, those cerium-based abrasives of B/A≧0.06 or D/A≧0.04 should be rejected. The abrasive preferably satisfies B/A≦0.05, more preferably B/A≦0.03, still more preferably B/A≦0.01 to reduce scratches left on the ground surface, or D/A≦0.03, more preferably D/A≦0.008 for the same reason. The abrasive can be examined for its grindability based on only C/A ratio, when its grindability is sufficiently low, because such an abrasive normally leaves few scratches on the ground surface and examination of the scratch-related characteristics based on B/A ratio may not be necessary. On the other hand, consider a case where an abrasive is required to leave only a limited number of scratches on the ground surface and, at the same time, to have at least a given grindability. In this case, two ratios, B/A or D/A and C/A, are used as the standards. In other words, a cerium-based abrasive passes the examination, when it satisfies B/A<0.06 or D/A<0.04 and C/A corresponding to a required grindability.

For an abrasive from a stock material, e.g., bastnasite concentrate, which contains a relatively large amount of impurities other than rare-earth elements, the peak relevant to Ln$_x$O$_y$ is the maximum peak similarly to the other cases, but, when intensity of the peak relevant to LnF$_3$ or LnOF is low, another material may have the maximum peak in the above-described angle range. Nevertheless, however, it is possible even in such a case to examine the abrasive quality based on the B/A, C/A or D/A standards determined by the maximum peak in each of the above angle ranges, because the peak intensity relevant to another material is much lower than the maximum peak intensity A relevant to $Ln_xO_y$, or only slightly higher than the peak intensity B, c or D relevant to $LnF_3$ or LnOF.

It is also possible to examine the abrasive quality in a similar manner, when the maximum peak "a" chosen for the present invention is replaced by another peak relevant to $Ln_xO_y$, and/or the peak "c" chosen for the present invention is replaced by another peak relevant to LnOF. Nevertheless, however, use of the maximum peaks "a" and "c" chosen for the present invention is more preferable viewed from accuracy of the examination, because each of them is the peak of the highest intensity for each material. It should be also noted that peaks relevant to LnOF other than the peak "c" may not be distinguished from noise and lead to an erroneous conclusion, when its intensity is sufficiently low. It is therefore more preferable to use the peak "c" chosen for the present invention, also in consideration of the above.

The XRD peak intensity is defined as the top intensity for each peak subtracted by the intensity commonly referred to as the back ground or base line. The peak is also defined as the one whose intensity is 0.5% or more of the peak intensity A, and regarded as noise when its intensity is lower than the above. It is therefore necessary to select the conditions for measuring an XRD peak under which it can be clearly distinguished from noise, when its peak is 0.5% or more of the peak intensity A. Examples of these conditions are described in EXAMPLES described later, although the adequate conditions are not limited thereto.

The targets for XRD analysis include copper (Cu), to begin with, molybdenum (Mo), iron (Fe), cobalt (Co), tungsten (W) and silver (Ag), of which the Cu target is preferable in that it gives the highest peak intensity and hence more accurate results.

It would be better understood from the above description that a cerium-based abrasive can be regarded as a good abrasive when it satisfies the relationship B/A<0.06 or D/A<0.04, because such an abrasive will leave only a limited number of scratches on the ground surface. An abrasive preferably satisfies B/A≦0.05, more preferably B/A≦0.03, still more preferably B/A≦0.01 to reduce scratches left on the ground surface, or D/A≦0.03, more preferably D/A≦0.008 for the same reason. A cerium-based abrasive can be regarded as an excellent abrasive when it satisfies the relationship 0.05≦C/A≦0.60, because it controls formation of orange peel and has a sufficiently high grindability. An abrasive having a C/A ratio less than 0.05, when used for grinding a surface, tends to produce orange peel, which will adversely affect the grinding. On the other hand, an abrasive having a C/A ratio more than 0.60 will have decreased grinding force, because of an insufficient content of $Ln_xO_y$.

A cerium-based abrasive having required grinding characteristics for a specific purpose can be provided by selecting adequate B/A or D/A and C/A ratios. For example, a cerium-based abrasive simultaneously satisfying the relationships B/A<0.06 or D/A<0.04 and 0.05≦C/A≦0.60 can be provided as the one having a required practical grindability, because it leaves few scratches on the ground surface. A cerium-based abrasive simultaneously satisfying the relationships B/A<0.06 or D/A<0.04 and 0.10≦C/A≦0.60 is suitable for primary grinding of glass for liquid crystal and hard disks. A cerium-based abrasive simultaneously satisfying the relationships B/A≦0.01 or D/A≦0.008 and 0.10≦C/A≦0.60 is suitable for finish grinding of glass for liquid crystal. A cerium-based abrasive simultaneously satisfying the relationships B/A≦0.01 or D/A≦0.008 and 0.05≦C/A≦0.10 is suitable for finish grinding of hard disks.

The cerium-based abrasive of the present invention is normally used in the form of slurry, after being dispersed in a dispersion medium, e.g., water, to 5 to 30% by weight. The dispersion media useful for the present invention include water-soluble organic solvents, e.g., alcohol, polyhydric alcohol, acetone and tetrahydrofuran. However, water is a normal selection.

The cerium-based abrasive of the present invention preferably contains a high-molecular-weight organic dispersant. The organic dispersants useful for the present invention include polyacrylates, e.g., sodium polyacrylate, and carboxymethyl cellulose, polyethylene oxide and polyvinyl alcohol. Such an organic dispersant works to prevent foaming during the grinding process. It is incorporated in the abrasive at 0.1 to 0.8% by weight, beyond which it will exhibit little further effect.

The inventors of the present invention have also studied a method of producing an abrasive having required grinding characteristics for a specific purpose, based on the above-described XRD analysis results, to find that at least one of the B/A, C/A and D/A ratios, determined by XRD peak intensities, changes regularly with a fluorine content of the abrasive or temperature at which it is roasted, reaching the invention described below.

This inventions relates to a method of producing a fluorine-containing cerium-based abrasive containing La or Nd each at 0.5% or more per 100% of Ce, all by atom, and having a specific surface area of 12 $m^2/g$ or less, involving fluorination treatment of the abrasive before it is roasted, wherein a fluorine content and roasting temperature are determined by the XRD analysis results. More concretely, the cerium-based abrasive is analyzed by XRD with Cu—$K\alpha_1$ line as an X-ray source, to determine the maximum peak intensities A, B, C and D in a diffraction angle (2θ) range from 5 to 80°, 27.5±0.3° smaller than diffraction angle of peak a, 26.5±0.5° and 24.2±0.5°, respectively, and at least one of B/A, C/A and D/A ratios is compared with that of an abrasive of known production conditions, determined by XRD analysis, to determine the fluorine content and roasting temperature.

It is found, as described earlier, a cerium-based abrasive having lower B/A and D/A ratios leaves less scratches on the ground surface. Therefore, the production conditions for an abrasive of required grinding characteristics, e.g., fluorine content and roasting temperature, can be simply determined, by determining in advance the relationship for an abrasive of known production conditions (e.g., fluorine content and roasting temperature) between XRD-determined B/A or D/A ratio and these conditions and comparing these ratios of the abrasives with each other. A cerium-based abrasive can be produced under the fluorine content and roasting temperature thus simply determined. For example, a cerium-based abrasive will leave few scratches on the ground surface, when fluorine content and roasting temperature are controlled for the abrasive in such a way that it satisfies the relationship B/A<0.06. The abrasive preferably satisfies B/A≦0.05, more preferably B/A≦0.03, still more preferably B/A≦0.01 to reduce scratches left on the ground surface. For D/A ratio, the production conditions are controlled to give the relationship D/A<0.04, preferably D/A≦0.03, more preferably D/A≦0.008 for the same reason.

For C/A ratio, on the other hand, it is found that there is an adequate range, below which orange peel tends to occur to adversely affect the grinding, and above which grinding force tends to decline, both being undesirable. Therefore, the production conditions for an abrasive with required grinding characteristics, e.g., fluorine content and roasting temperature, can be simply determined, by determining in advance the relationship for an abrasive of known production conditions (e.g., fluorine content and roasting temperature) between the XRD-determined C/A ratio and these conditions and comparing the ratio of the abrasives with each other. A cerium-based abrasive can be produced under the fluorine content and roasting temperature simply determined. A cerium-based abrasive will be an excellent abrasive, and hence desirable, when it satisfies the relationship $0.05 \leq C/A \leq 0.60$, because it controls formation of orange peel and has a sufficiently high grindability.

Controlling a fluorine content of the abrasive and roasting temperature based on the two values of B/A or D/A and C/A ratios can give a cerium-based abrasive which leaves few scratches on the ground surface and has a required grindability or higher. More concretely, a fluorine content and roasting temperature are controlled to produce a cerium-based abrasive in such a way that the abrasive has a B/A ratio of less than 0.06 and, at the same time, C/A ratio which gives a required grindability.

The method of the present invention produces a cerium-based abrasive under the conditions of fluorine content and roasting temperature, controlled to give the abrasive having the required XRD-determined intensity ratios, e.g., B/A ratio. The XRD analysis to determine the intensity ratios such as B/A is used for the quality examination, as described earlier. The quality examination is carried out routinely. It is advantageous when the quality examination results can be used for setting or adjusting the production conditions, because the additional grinding test or the like is no longer necessary. As described above, the XRD-aided quality examination is much more simple than the grinding test. The method of the present invention for producing a cerium-based abrasive involves XRD analysis (quality examination) conducted for the abrasive as soon as it is produced, and the fluorine content and roasting temperature predicted by the intensity ratios, e.g., B/A, are immediately fed back for the next abrasive products. The present invention, therefore can produce a high-quality, stable cerium-based abrasive more efficiently.

One example of the method of producing a cerium-based abrasive is described in detail.

The stock materials for a cerium-based abrasive include oxide of rare earth, carbonate of rare earth and bastnasite concentrate. The oxide of rare earth is obtained as the mixed oxides of rare earth elements by roasting the stock in the form of, e.g., carbonates, hydroxides and oxalates. Bastnasite concentrate is powdered ore having fluorinated carbonate of rare earth as its major component, obtained through treatments such as crushing, flotation, acid leaching, drying.

The stock materials for cerium-based abrasive is crushed to given particle size to use. The stock material is crushed by, e.g., a ball mill in the presence of a solvent, to an average particle size of around 0.5 to 3 μm.

The crushed stock, when it is bastnasite concentrate, is normally treated with a mineral acid, e.g., hydrochloric, sulfuric or nitric acid, adjusted at a concentration of around 0.1 to 2N. This treatment reduces contents of, e.g., alkali metals (e.g., Na and Ca) and alkali-earth metals, and controls abnormal grain growth in the subsequent roasting step.

When an oxide or carbonate of rare earth is used as the stock, on the other hand, it is normally slurried and fluorination-treated with a fluorine-containing compound, e.g., ammonium fluoride or hydrofluoric acid, or an aqueous solution thereof. The fluorine content is preferably 5 to 100 g/L.

Even when bastnasite concentrate is used as the stock material, it may be fluorination-treated to increase its fluorine content. Moreover, even when an oxide or carbonate of rare earth is used as the stock material, it may be treated with a mineral acid, depending on its alkali and alkali-earth metal contents.

The cerium-containing stock material of rare earth, after being treated with a mineral acid or fluorination-treated, is dried and then roasted in an electrical furnace or the like at 600 to 1100° C., preferably 700 to 1000° C., for around 1 to 10 hours. It is then left for cooling, crushed and classified to obtain an abrasive. The abrasive preferably has an average particle size of around 0.05 to 3.0 μm and contains fluorine at 1 to 15% by weight, preferably 1 to 10%. It is possible to control particle size of the abrasive by controlling its fluorine content and roasting temperature.

A fluorine content of a cerium-based abrasive and temperature at which it is roasted can be predicted by a specific surface area and the XRD analysis with Cu—K$\alpha_1$ line as the X-ray source, wherein the XRD analysis measures intensity A of the maximum peak "a" in a diffraction angle (2θ) range from 5 to 80°, and at least one of intensity B of the maximum peak having a diffraction angle in a range of 27.5±0.3° and smaller than the angle of the peak "a," intensity C of the maximum peak having a diffraction angle in a range of 26.5±0.5° and intensity D of the maximum peak having a diffraction angle in a range of 24.2±0.5°, and at least one of the B/A, C/A and D/A ratios is used to control fluorine content and roasting temperature.

The abrasive preferably has a specific surface area of 12 m²/g or less, more preferably 10 m²/g or less, still more preferably 8 m²/g or less. The abrasive having a specific surface area of more than 12 m²/g may not have a required particle size to increase grindability, even when the particles grow during the roasting step, leaving practical problems. The specific surface area is determined by the common BET method with nitrogen gas.

BEST MODE FOR CARRYING OUT THE INVENTION

The present invention is described more concretely by EXAMPLES.

The stock materials used in EXAMPLES were an oxide of rare earth having a total rare earth oxide (TREO) content of 99%, and $CeO_2$ and $La_2O_3$ at 57 to 61% and 31 to 34%, respectively based on the TREO; and bastnasite concentrate having a TREO content of 67 to 73%, and $CeO_2$ and $La_2O_3$ at 40 to 43% and 24 to 26%, respectively based on the TREO, all by weight. Each was ball-milled in the presence of a solvent (water) to have a powder of 1.0 μm in average particle size. It was treated with a mineral acid (1N hydrochloric acid) in the case of bastnasite concentrate, and with an aqueous solution of ammonium fluoride containing fluorine at 15 to 25 g/L in the case of oxide of rare earth to have a given fluorine content. The resultant slurries were filtered, dried and roasted in an electrical furnace at a given roasting temperature (refer to Table 1) for 2 hours, and then left for cooling, crushed and classified to obtain Abrasives 1 to 10 (shown in Table 1). Abrasives 1 to 6 and 10 were from oxide of rare earth as the stock material, and Abrasives 7 to 9 from bastnasite concentrate. Table 1 gives roasting temperature and fluorine quality (fluorine content) of these abrasives.

Fluorine was analyzed by the fluorine ion electrode method, after the sample was molten in an alkali and extraction with hot water.

Each of Abrasives 1 to 10 was tested to evaluate grindability and scratches left on the ground surface, where it was dispersed in water to have a 10 wt % abrasive slurry and used to grind glass for a 65 mm-diameter planar panel by a high-speed grinder at a grinding pressure of 1.54 MPa (15.7 kg/cm²). Evaluation of grindability and scratches were evaluated on the surface of glass after grinding.

For evaluation of grindability, the sample of glass for a planar panel was weighed before and after the grinding to determine weight loss, by which cut thickness was estimated.

Scratches were evaluated by transmission and reflection. More concretely, the ground surface was irradiated with light from a halogen lamp (300,000 lux) to observe the glass surface, to evaluate the scratches by the extent (size and the numbers) thereof, scored by deducting points from 100 points. The results are given in Table 1.

Each abrasive was measured for its specific surface area and degree of cohesion. Specific surface area was measured for the accurately weighed sample by an automatic specific surface area analyzer (Manufactured by Yuasa Ionics Co., Ltd., Multisorb 12). Degree of cohesion was measured by a powder tester (Hosokawa Micron Co., Ltd.), for which 355, 250 and 44 μm sieves were used. The results are given in Table 1.

Figure 2:
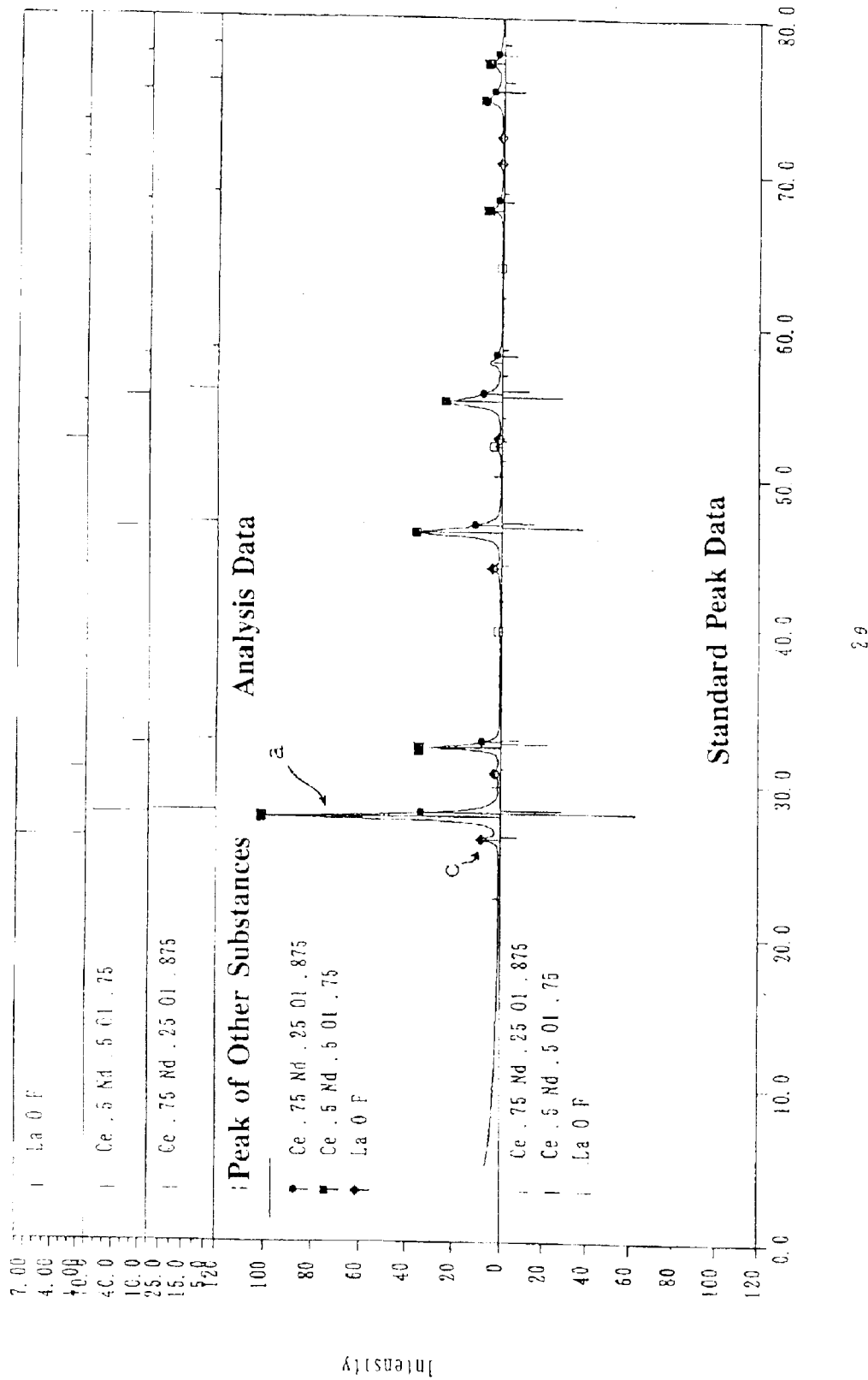
FIG. 2 shows the X-ray diffraction analysis data of Abrasive 1.
Figure 3:
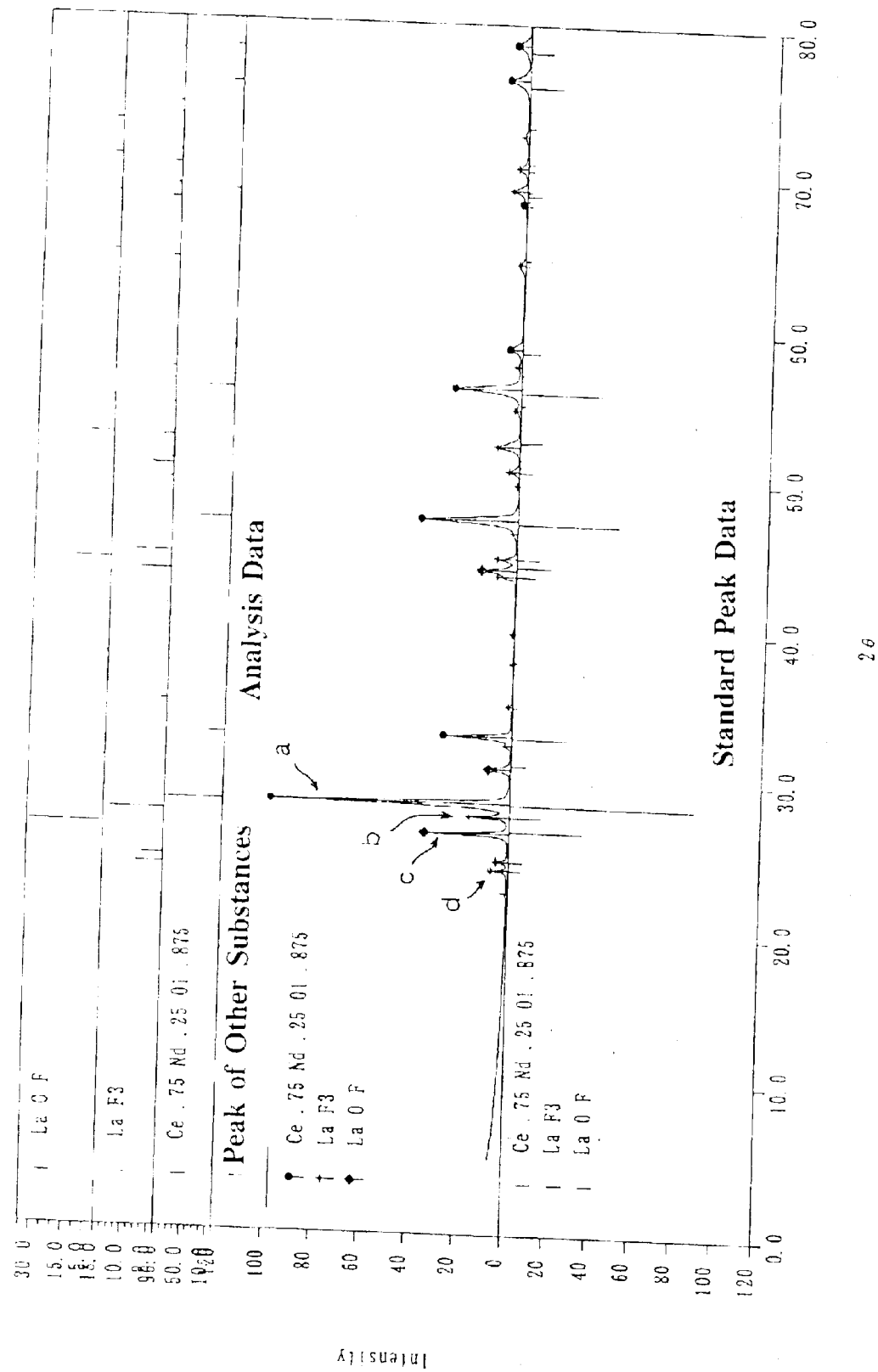
FIG. 3 shows the X-ray diffraction analysis data of Abrasive 6.

With the use of X-ray diffractometer MXP18 (Manufactured by MAC Science Co., Ltd.), Abrasives 1 to 10 were analyzed by XRD to determine XRD intensity, with a Cu target and Cu—K$\alpha_1$ line as the X-ray source under the conditions of tube voltage: 40 kV, tube current: 150 mA, diffraction angle (2θ) range: 5 to 80°, sampling width: 0.02°, and scanning rate: 4°/minute. The results are given in Table 2. The XRD analysis data of Abrasives 1 and 6 are given in FIGS. 2 and 3.

The XRD analysis measured intensity A of the maximum peak "a" and its diffraction angle $\theta_A$ in a diffraction angle (2θ) range from 5 to 80°, diffraction angle $\theta_B$ and intensity B of the maximum peak having a diffraction angle in a range of 27.5±0.3° and smaller than the angle of the peak "a," diffraction angle $\theta_C$ and intensity C of the maximum peak having a diffraction angle in a range of 26.5±0.5°, and diffraction angle $\theta_D$ and intensity D of the maximum peak having a diffraction angle in a range of 24.2±0.5°. The results are given in Table 2, where peak intensities B, C and D are relative to that of peak intensity A (100). As described earlier, the peak is defined as the one whose intensity is 0.5% or more of the peak intensity A, and the peak intensities B, C and D are regarded as zero when they are lower than 0.5% of the peak intensity A.

The relationship between grindability and C/A ratio is shown in FIG. 1.

TABLE 1

| | Roasting temperature [°C.] | Fluorine content [%] | Specific Surface [m²/g] | Degree of Cohesion [%] | Contents (Ce = 100 parts by atom) La Parts by atom | Nd Parts by atom | Grindability [μm] | Evaluations of scratches Transmission | Reflection |
|---|---|---|---|---|---|---|---|---|---|
| Abrasive 1 | 810 | 4.2 | 7.84 | 49.1 | 54.6 | 2.2 | 25.0 | 100 | 100 |
| Abrasive 2 | 810 | 4.7 | 7.37 | 40.6 | 59.7 | 7.9 | 24.0 | 100 | 100 |
| Abrasive 3 | 920 | 5.2 | 3.75 | 59.4 | 59.7 | 1.8 | 35.7 | 100 | 97 |
| Abrasive 4 | 970 | 5.0 | 3.24 | 66.1 | 61.5 | 4.5 | 34.6 | 100 | 97 |
| Abrasive 5 | 980 | 7.3 | 2.29 | 85.8 | 55.1 | 2.8 | 40.4 | 100 | 76 |
| Abrasive 6 | 990 | 7.8 | 1.82 | 88.9 | 57.8 | 3.5 | 39.5 | 80 | All glass test pieces have many scratches |
| Abrasive 7 | 770 | 5.8 | 8.45 | 25.5 | 25.2 | 7.6 | 25.3 | 100 | 100 |
| Abrasive 8 | 800 | 5.6 | 7.64 | 35.6 | 25.2 | 8.2 | 25.5 | 100 | 100 |
| Abrasive 9 | 970 | 7.1 | 1.60 | 23.5 | 25.3 | 7.3 | 38.0 | 100 | 100 |
| Abrasive 10 | 550 | 4.3 | 15.76 | 74.5 | 58.2 | 3.3 | 7.5 | 100 | 100 |

TABLE 2

| | XRD intensity and intensity ratio | | | | | | |
|---|---|---|---|---|---|---|---|
| | C | A | B | D | C/A | B/A | D/A |
| Abrasive 1 | 8 | 100 | 0 | 0 | 0.08 | 0.00 | 0.00 |
| Abrasive 2 | 7 | 100 | 0 | 0 | 0.07 | 0.00 | 0.00 |
| Abrasive 3 | 50 | 100 | 0 | 0 | 0.50 | 0.00 | 0.00 |
| Abrasive 4 | 47 | 100 | 0 | 0 | 0.47 | 0.00 | 0.00 |
| Abrasive 5 | 36 | 100 | 6 | 4 | 0.36 | 0.06 | 0.04 |
| Abrasive 6 | 34 | 100 | 17 | 10 | 0.34 | 0.17 | 0.10 |
| Abrasive 7 | 8 | 100 | 0 | 0 | 0.08 | 0.00 | 0.00 |
| Abrasive 8 | 10 | 100 | 0 | 0 | 0.10 | 0.00 | 0.00 |
| Abrasive 9 | 53 | 100 | 0 | 0 | 0.53 | 0.00 | 0.00 |
| Abrasive 10 | 3 | 100 | 0 | 0 | 0.03 | 0.00 | 0.00 |

As shown in Table 1, Abrasive 10, having a specific surface area exceeding 12 m²/g, is a poor abrasive, because of its insufficient properties of very low grindability and high adhesion to the surface to be ground, although good in grinding evaluation.

Abrasives 1 to 9, having a specific surface area of 12 m²/g or less, have a correlation between the C/A ratio and grindability, as shown in Tables 1 and 2 and FIG. 1. In other words, grindability tends to increase as the C/A ratio increases, and grindability can be estimated for grinding from the C/A ratio.

It is found, as shown in Tables 1 and 2, that Abrasives 1 to 4 and 7 to 9 out of Abrasives 1 to 9 which have a specific surface area of 12 m²/g or less but 1.0 m²/g or more have zero peak intensities B and D, and hence zero B/A and D/A ratios, leaving few scratches on the ground surface. On the other hand, scratches are produced rapidly in a B/A or D/A region of B/A≧0.06 or D/A≧0.04 (Abrasives 5 and 6). This conceivably results from increased fluorine content to further grow the LnOF phase (e.g., LaOF phase), which, although increasing grindability, leaves the $LnF_3$ phase (e.g., $LaF_3$ phase) because of the limited growth of the LnOF phase (e.g., LaOF phase) at the normal roasting temperature (around 600 to 1100° C.). Abrasives 5 and 6 have higher B/A and D/A ratios but slightly lower C/A ratio than Abrasives 3 and 4.

It is therefore judged that a cerium-based abrasive leaves less scratches on the ground surface as its B/A or D/A ratio decreases, and, conversely, leaves more scratches when its B/A or D/A is in a region of B/A≧0.06 or D/A≧0.04. Grindability of an abrasive can be judged based on a C/A ratio.

A cerium-based abrasive leaving only a limited number of scratches on the ground surface can be produced by adjusting its fluorine content and temperature at which it is roasted, based on the B/A or D/A ratio. It will leave few scratches, when its fluorine content and temperature at which it is roasted are adjusted in such a way to avoid B/A≧0.06 or D/A≧0.04.

Moreover, a cerium-based abrasive having a given grindability or more can be produced when its fluorine content and temperature at which it is roasted are adjusted based on the C/A ratio.

Therefore, a cerium-based abrasive leaving few scratches on the ground surface and having a given grindability or more can be produced, when its fluorine content and temperature at which it is roasted are adjusted based on B/A or D/A and C/A ratios. More concretely, it is recommended to adjust fluorine content and roasting temperature in such a way to avoid B/A≧0.06 or D/A≧0.04, and, at the same time, to keep a C/A ratio corresponding to a required grindability.

A cerium-based abrasive can guarantee that it leaves few scratches on the ground surface, when it satisfies B/A<0.06 or D/A<0.04. The abrasive preferably satisfies B/A≦0.05, more preferably B/A≦0.03, still more preferably B/A≦0.01 to reduce scratches left on the ground surface, or D/A≦0.03, more preferably D/A≦0.008 for the same reason.

A cerium-based abrasive can be sufficiently serviceable, when it simultaneously satisfies the relationships B/A<0.06 or D/A<0.04 and 0.05≦C/A≦0.60, because it leaves few scratches on the ground surface and secures a grindability of around 23 to 40 μm or more as shown in Tables 1, 2 and FIG. 1. A cerium-based abrasive simultaneously satisfying the relationships B/A<0.06 or D/A<0.04 and 0.10≦C/A≦0.60 is suitable for primary grinding of glass for liquid crystal and hard disks, because it leaves few scratches on the ground surface and secures a grindability of around 23 to 40 μm or more. A cerium-based abrasive simultaneously satisfying the relationships B/A≦0.01 or D/A≦0.008 and 0.10≦C/A≦0.60 is suitable for finish grinding of glass for liquid crystal, because it leaves essentially no scratches on the ground surface and secures a grindability of around 25 to 40 μm or more. A cerium-based abrasive simultaneously satisfying the relationships B/A≦0.01 or D/A≦0.008 and 0.05≦C/A≦0.10 is suitable for finish grinding of hard disks, because it leaves essentially no scratches on the ground surface and secures a grindability of around 23 to 25 μm or more.

INDUSTRIAL APPLICABILITY

The present invention is for examination of quality (grinding characteristics) of a cerium-based abrasive. The method of the present invention for examining quality of cerium-based abrasives allows the abrasive quality to be simply examined, and screen the cerium-based abrasives of required grinding characteristics. The cerium-based abrasive of the present invention has grinding characteristics for specific purposes, and can be suitably used for primary grinding of glass for liquid crystal and hard disks, finish grinding of glass for liquid crystal, or finish grinding of hard disks. The method of the present invention can produce a cerium-based abrasive which has grinding characteristics for specific purposes.

What is claimed is:

1. A method for examining the quality of a cerium abrasive having a specific surface area of no more than 12 $m^2/g$ and containing fluorine and at least 0.5 atomic parts La or Nd per 100 atomic parts Ce, comprising the steps of:
    (a) performing an X-ray diffraction (XRD) analysis on the cerium abrasive with Cu—$K\alpha_1$ line as an X-ray source, and measuring intensity A and at least one of intensities B, C and D, wherein intensity A is the maximum peak "a" in a diffraction angle ($2^\theta$) range from 5 to 80°, intensity B is the maximum peak having a diffraction angle in a range of 27.5±0.30°, and less than the angle of peak "a", intensity C is the maximum peak having a diffraction angle in a range of 26.5±0.5°, and intensity D is the maximum peak having a diffraction angle in a range of 24.2±0.5°; and
    (b) evaluating the quality of the abrasive by comparing at least one of the ratios B/A, C/A or D/A of the cerium abrasive with the corresponding B/A, C/A or D/A ratios, as determined by XRD analysis, of an abrasive of known grinding characteristics.

2. A cerium abrasive having a specific surface area of no more than 12 $m^2/g$ and containing fluorine and at least 0.5 atomic parts La or Nd per 100 atomic parts Ce, the cerium abrasive having an intensity ratio B/A of less than 0.06,
    wherein intensity A and intensity B are determined by XRD analysis with Cu—$K\alpha_1$ line as an X-ray source, and intensity A is the maximum peak "a" in a diffraction angle ($2^\theta$) range from 5 to 80° and intensity B is the maximum peak having a diffraction angle in a range of 27.5±0.3°, and less than the angle of peak "a."

3. A cerium abrasive having a specific surface area of no more than 12 $m^2/g$ and containing fluorine and at least 0.5 atomic parts La or Nd per 100 atomic parts Ce, the cerium abrasive having an intensity ratio D/A of less than 0.04,
    wherein intensity A and intensity D are determined by XRD analysis with Cu—$K\alpha_1$ line as an X-ray source, and intensity A is the maximum peak "a" in a diffraction angle ($2^\theta$) range from 5 to 80° and intensity D is the maximum peak having a diffraction angle in a range of 24.2±0.5°.

4. The cerium abrasive of claim 2, having an intensity ratio C/A no less than 0.05 and no more than 0.60, wherein intensity C is determined by XRD analysis with Cu—$K\alpha_1$ line as an X-ray source and intensity C is the maximum peak having a diffraction angle in a range of 26.5±0.5°.

5. The cerium abrasive of claim 3, having an intensity ratio C/A no less than 0.05 and no more than 0.60, wherein intensity C is determined by XRD analysis with Cu—$K\alpha_1$ line as an X-ray source and intensity C is the maximum peak having a diffraction angle in a range of 26.5±0.5°.

6. The cerium abrasive of claim 4, having an intensity ratio C/A no less than 0.10.

7. The cerium abrasive of claim 2, having an intensity ratio B/A of no more than 0.01 and C/A no less than 0.10 and no more than 0.60, wherein intensity C is determined by XRD analysis with Cu—K$\alpha_1$ line as an X-ray source and intensity C is the maximum peak having a diffraction angle in a range of 26.5±0.5°.

8. The cerium abrasive of claim 2, having an intensity ratio B/A of no more than 0.01 and C/A no less than 0.05 and no more than 0.10, wherein intensity C is determined by XRD analysis with Cu—K$\alpha_1$ line as an X-ray source and intensity C is the maximum peak having a diffraction angle in a range of 26.5±0.5°.

9. The cerium abrasive of claim 3, having an intensity ratio C/A no less than 0.10 and no more than 0.60, wherein intensity C is determined by XRD analysis with Cu—K$\alpha_1$ line as an X-ray source and intensity C is the maximum peak having a diffraction angle in a range of 26.5±0.5°.

10. The cerium abrasive of claim 9, having an intensity ratio D/A of no more than 0.008.

11. The cerium abrasive of claim 3, having an intensity ratio D/A of no more than 0.008 and C/A no less than 0.05 and no more than 0.10, wherein intensity C is determined by XRD analysis with Cu—K$\alpha_1$ line as an X-ray source and intensity C is the maximum peak having a diffraction angle in a range of 26.5±0.5°.

12. A method for optimizing the fluorine content and roasting temperature in a process for producing a cerium abrasive having a specific surface area of no more than 12 m²/g and containing fluorine and at least 0.5 atomic parts La or Nd per 100 atomic parts Ce, the process comprising the steps of fluorinating and then roasting a cerium stock material, the method comprising determining the optimum fluorine content of the cerium abrasive after the fluorinating step and the temperature for the roasting step by comparing at least one of intensity ratios B/A, C/A and D/A of the cerium abrasive with the corresponding B/A, C/A or D/A ratios, as determined by XRD analysis, of an abrasive produced at known fluorine content and roasting temperatures, wherein intensities A, B, C and D are determined by XRD analysis with Cu—K$\alpha_1$ line as an X-ray source, and intensity A is the maximum peak "a" in a diffraction angle (2$\theta$) range from 5 to 80°, intensity B is the maximum peak having a diffraction angle in a range of 27.5±0.3°, and less than the angle of peak "a," intensity C is the maximum peak having a diffraction angle in a range of 26.5±0.5°, and intensity D is a maximum peak having a diffraction angle in a range of 24.2±0.5°.

13. The method according to claim 12, wherein the fluorine content in the fluorination step and the temperature for the roasting step are adjusted so that the cerium abrasive has a B/A ratio of less than 0.06 and a D/A ratio of less than 0.04.

* * * * *